3,210,370
PROCESS FOR PREPARING 2,2'-METHYLENE-
BISARENEIMIDAZOLES
Joseph J. Ursprung, Portage, Mich., assignor to The Upjohn Company, Kalamazoo, Mich., a corporation of Delaware
No Drawing. Filed June 22, 1964, Ser. No. 377,085
8 Claims. (Cl. 260—309.2)

This application is a continuation-in-part of application Serial No. 39,789, filed June 30, 1960, and now abandoned.

This invention relates to a novel process for the preparation of 2,2'-methylenebisareneimidazoles and is more particularly concerned with the preparation of 2,2'-methylenebisbenzimidazoles.

The novel process of the invention consists in a method for the preparation of 2,2'-methylenebisareneimidazoles which comprises the steps of (a) reacting a protonated carbalkoxyacetimino alkyl ether base which in the form of the free base has the formula:

$$\overset{O}{\underset{}{\overset{\|}{R_2OC}}}-\underset{R_1}{\overset{}{\overset{}{C}H}}-\overset{NH}{\underset{}{\overset{\|}{C}}}-OR_3 \quad (I)$$

wherein $R_1$ is selected from the class consisting of hydrogen and an indifferent group, and $R_2$ and $R_3$ represent alkyl with an o-arylenediamine having at least 3 replaceable amino-hydrogens and no other groups reactive with the protonated carbalkoxyacetimino alkyl ether base to form the corresponding alkyl 2-(2-areneimidazolyl)alkanoate and (b) reacting the alkyl 2-(2-areneimidazolyl)alkanoate so obtained with an o-arylenediamine having at least 3 replaceable amino-hydrogens and no other groups reactive with the said alkyl 2-(2-areneimidazolyl)alkanoate which o-arylenediamine can be identical to or different from the o-arylenediamine employed in step (a) of the process, to obtain the desired 2,2'-methylenebisareneimidazole.

The process of the invention is illustrated by the following equations:

STEP (a)

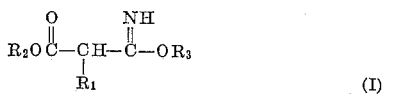

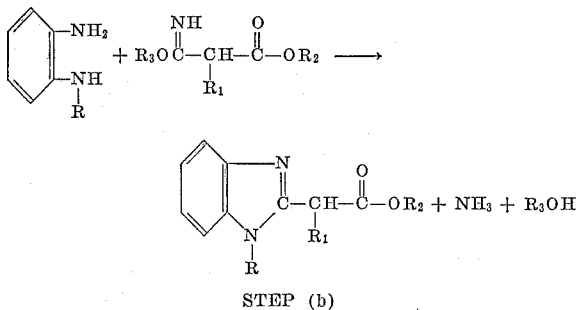

STEP (b)

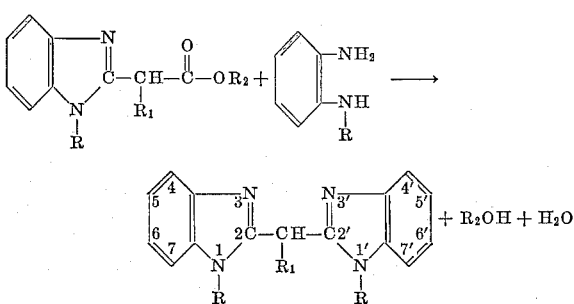

In the above formulae R is selected from the class consisting of hydrogen and an indifferent group, and $R_1$, $R_2$, and $R_3$ have the significance hereinbefore defined. In the above equations the process of the invention has been illustrated by reference to the preparation of 2,2'-methylenebisbenzimidazoles from o-phenylenediamine or a N-mono-substituted o-phenylenediamine but it will be understood that the process of the invention is not limited to this particular application and can be applied to the preparation of any 2,2'-methylenebisareneimidazole using any o-arylenediamine in both steps (a) and (b) of the process. Thus, in the formulae shown in the above equations the benzene nucleus of either or both of the o-phenylenediamines shown in steps (a) and (b) of the process can be substituted by one or more groups which are inert under the conditions of the above reactions. Such groups include benzo, naphtho, alkyl, alkenyl, aralkyl, aryl, halogen, cyano, nitro, alkoxy, aralkoxy, aryloxy, alkylenedioxy, alkylmercapto, aralkylmercapto, arylmercapto, alkyl-, aralkyl-, and aryl-substituted-amino, sulfonacyl, sulfonamido, and the like.

The term "indifferent group" means any group which does not interfere with the reactions of steps (a) and (b) of the process of the invention. Radicals falling within the above definition will be readily recognized by the skilled chemist and include alkyl, haloalkyl, alkoxyalkyl, aryloxyalkyl, aralkyl, aryl, and aralkyl and aryl substituted by inert groups such as those given above.

The term "protonated carbalkoxyacetimino alkyl ether base" means the cation obtained by neutralizing the free base having the Formula I with a strong mineral acid such as sulfuric, hydrochloric, hydrobromic, and like acids. Preferably the compound having the Formula I is protonated by conversion to its hydrochloride and is employed as such in step (a) of the process of the invention.

Examples of alkyl are methyl, ethyl, propyl, butyl, amyl, hexyl, heptyl, octyl, and isomeric forms thereof. Examples of alkenyl are propenyl, butenyl, pentenyl, hexenyl, heptenyl, octenyl, and isomeric forms thereof. Examples of aralkyl are benzyl, phenethyl, phenylpropyl, benzhydryl, and the like. Examples of aryl are phenyl, tolyl, xylyl, biphenylyl, and the like. Examples of halogen are fluorine, chlorine, bromine, and iodine. Examples of alkoxy are methoxy, ethoxy, propoxy, butoxy, amyloxy, hexyloxy, heptyloxy, octyloxy, and the like. Examples of aralkoxy are benzyloxy, phenethoxy, benzhydryloxy, and the like. Examples of aryloxy are phenoxy, tolyloxy, xylyloxy, biphenylyloxy, and the like. Examples of alkylenedioxy are methylenedioxy, ethylenedioxy, and the like. Examples of alkylmercapto are methylmercapto, ethylmercapto, propylmercapto, butylmercapto, amylmercapto, hexylmercapto, heptylmercapto, octylmercapto, and isomeric forms thereof. Examples of aralkylmercapto are benzylmercapto, phenethylmercapto, benzhydrylmercapto, and the like. Examples of arylmercapto are phenylmercapto, tolylmercapto, xylylmercapto, biphenylylmercapto, and the like. Examples of alkyl-substituted-amino are methylamino, dimethylamino, ethylamino, isopropylamino, diisopropylamino, butylamino, isohexylamino, dioctylamino, and the like. Examples of aralkyl-substituted-amino are benzylamino, dibenzylamino, phenethylamino, benzhydrylamino, and the like. Examples of aryl-substituted-amino are anilino, toluidino, xylidino, diphenylylamino, and the like. Examples of sulfonacyl are toluenesulfonyl, benzenesulfonyl, methanesulfonyl, and the like. Examples of sulfonamido are methanesulfonamido, benzenesulfonamido, toluenesulfonamido, and the like. Examples of haloalkyl are trichloromethyl, trifluoromethyl, dichloroethyl, and the like. Examples of alkoxyalkyl are methoxyethyl, ethoxymethyl, propoxybutyl, octyloxymethyl, and the like. Examples of aryloxyalkyl are phenoxymethyl, phenoxyethyl, phenoxybutyl, tolyloxypropyl, naphthoxymethyl, and the like.

The process of the invention can be carried out in the following manner:

*Step (a).*—The reaction is carried out advantageously by bringing the o-arylenediamine and the protonated carbalkoxyacetimino alkyl ether having the Formula I together in substantially equimolar proportions in the presence of an inert solvent such as a lower-alkanol, for example, methanol, ethanol, isopropyl alcohol, and the like, liquid aliphatic polyhydroxy compounds such as ethylene glycol, propylene glycol, diethylene glycol, triethylene glycol, glycerol, and the like, and monoethers thereof such as methyl Carbitol, Carbitol, and butyl Carbitol (the methyl, ethyl, and butyl ethers, respectively, of diethylene glycol) and methyl Cellosolve, Cellosolve, and butyl Cellosolve (the methyl, ethyl, and butyl ethers, respectively, of ethylene glycol).

Generally speaking, the reaction is carried out advantageously at tempeatures within the range of about 20° C. to about 150° C., and preferably within the range of about 35° C. to about 105° C. In many instances it is very convenient and satisfactory to carry out the reaction at the boiling point of the inert solvent, e.g., when employing ethanol.

The desired alkyl 2-(2-areneimidazolyl)alkanoate is isolated from the reaction mixture by conventional procedures, for example, by dilution of the reaction mixture with water, followed by basification of the solution and isolation of the resulting precipitate by filtration. The compound so obtained can be purified by conventional procedures, for example, by recrystallization.

*Step (b).*—The alkyl 2-(2-areneimidazolyl)alkanoate obtained in step (a) is condensed with a second o-arylenediamine by heating the reactants together alone or, if desired, in the presence of an inert solvent such as trichlorobenzene, decalin, tetralin, and the like. Advantageously, the reaction is carried out in the presence of an inert solvent at temperatures within the range of about 150° C. to about 250° C., and preferably within the range of about 175° C. to about 225° C. Advantageously the reactants are present in substantially equimolar proportions. Generally speaking the desired compound, namely, the 2,2'-methylenebisareneimidazole, separates on cooling the reaction mixture and can be isolated therefrom by filtration. The compound so obtained can be purified by conventional procedures, for example, by recrystallization.

It will be appreciated that when different o-arylenediamines are employed in steps (a) and (b), respectively, the same final product is obtained whether one of the o-arylenediamines is employed in step (a) and the other o-arylenediamine is employed in step (b), or vice versa.

Whilst the process of the invention is of general application and can be employed in the preparation of any 2,2'-methylenebisareneimidazole, said process is of particular application in the preparation of 2,2'-methylenebisbenzimidazoles. Thus, when applied to the preparation of the latter group of compounds, the process of the invention consists in a process for the preparation of 2,2'-methylenebisbenzimidazoles which comprises reacting a protonated carbalkoxyacetimino alkyl ether base having the Formula I above with a 1,2-phenylenediamine having at least 3 replaceable amino-hydrogens and no other groups reactive with the said protonated carbalkoxyacetimino alkyl ether base, the benzene nucleus of said 1,2-phenylenediamine being substituted by from 1 to 4 groups selected from the class consisting of hydrogen, alkyl, alkenyl, aralkyl, aryl, halogen, cyano, nitro, alkoxy, aralkoxy, aryloxy, alkylenedioxy, akylmercapto, aralkylmercapto, arylmercapto, and alkyl-, aralkyl-, and aryl-substituted-amino, sulfonacyl, and sulfonamido in the presence of an inert solvent at temperatures within the range of about 20° C. to about 150° C., to obtain the correspondingly substituted alkyl 2-(2-benzimidazolyl)-alkanoate, and heating the latter in an inert solvent at temperatures within the range of about 150° C. to about 250° C. with the same or a different 1,2-phenylenediamine having at least 3 replaceable amino-hydrogens and no other groups reactive with the said substituted alkyl 2-(2-benzimidazolyl)alkanoate, the benzene nucleus of said 1,2-phenylenediamine being substituted by from 1 to 4 groups selected from the class consisting of hydrogen, alkyl, alkenyl, aralkyl, aryl, halogen, cyano, nitro, alkoxy, aralkoxy, aryloxy, alkylenedioxy, alkylmercapto, aralkylmercapto, arylmercapto, alkyl-, aralkyl-, and aryl-substituted-amino, sulfonacyl, and sulfonamido, to obtain the desired 2,2'-alkylenebisbenzimidazole.

The reaction conditions employed in the two steps of the above process for the preparation of 2,2'-methylenebisbenzimidazoles are the same as those described previously for the process of the invention. It is to be noted that where different 1,2-phenylenediamines are employed in steps (a) and (b), respectively, the same final product is obtained whether one of the 1,2-phenylenediamines is employed in step (a) and the other 1,2-phenylenediamine is employed in step (b), or vice versa.

The protonated carbalkoxyacetimino alkyl ether, i.e., the mineral acid salt of the free base having the Formula I which is employed in the process of the invention is prepared readily by treating the corresponding alkyl α-cyanoalkanoate

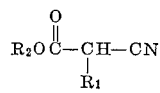

wherein $R_1$ and $R_2$ have the significance hereinbefore defined, with the appropriate acid in the presence of the appropriate alkanol $R_3OH$ wherein $R_3$ has the significance hereinbefore defined. For example, the hydrochloride of the compound having the Formula I is prepared advantageously by passing anhydrous hydrogen chloride gas into a substantially equimolar mixture of the alkyl α-cyanoalkanoate and the alkanol in solution in an inert solvent such as ether. Preferably the reaction is carried out at a temperature of the order of 0° C. Generally speaking, the product so obtained is in a sufficient state of purity to be used without further treatment but, if desired, the compound can be purified by conventional procedures, for example, by recrystallization.

The alkyl α-cyanoalkanoates

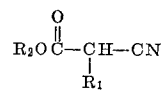

which are employed in the preparation of the compounds having the Formula I are for the most part known or can be prepared by methods known in the art. Thus the alkyl α-cyanoalkanoates in which $R_1$ is alkyl, aralkyl, aryloxyalkyl, alkoxyalkyl, and haloalkyl, can be prepared from the corresponding alkyl cyanoacetate by condensing the latter with the appropriate aldehyde

wherein X is such that $R_1=X \cdot CH_2—$, to form a compound having the formula

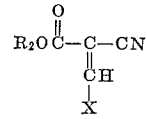

wherein $R_1$ and $R_2$ have the significance hereinbefore defined, and hydrogenating the latter compound in the presence of a palladium-on-charcoal catalyst to obtain the desired alkyl α-cyanoalkanoate. The conditions employed in this synthesis advantageously are those described by Alexander and Cope, J. Am. Chem. Soc. 66, 886, 1944, for the preparation of ethyl α-cyanoalkanoates

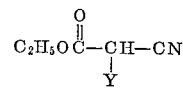

wherein Y is ethyl, propyl, isopropyl, butyl, isobutyl, sec.-butyl, 1-methylbutyl, isoamyl, heptyl, benzyl, 1,3-dimethylbutyl, 1-methylhexyl, 4-heptyl, 1-methylheptyl, and cyclohexyl, from ethyl cyanoacetate and the appropriate aldehyde.

The alkyl α-cyanoalkanoates

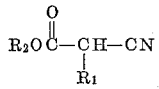

in which $R_1$ is aryl or substituted aryl as hereinbefore defined, can be prepared by reaction of the appropriately substituted benzyl cyanide and the appropriate dialkyl carbonate in the presence of sodamide, using the procedure described by Nelson and Cretcher, J. Am. Chem. Soc. 50, 2761, 1928, for the preparation of ethyl α-cyanophenylacetate.

The o-arylenediamines which are employed in the process of the invention are known in the art or can be prepared by methods which are well-known in the art. For example, the 1,2-phenylenediamines having 4 replaceable amino-hydrogens can be prepared by the reduction of the corresponding o-dinitrobenzenes or o-nitroanilines, which latter groups of compounds can be obtained by nitration of the appropriate benzene or aniline, respectively. The procedure employed is advantageously that described by Lambooy, J. Am. Chem. Soc. 71, 3756, 1949, for the preparation of 4,5-diethyl-1,2-phenylenediamine from 1,2-diethylbenzene.

The o-arylenediamines (other than o-phenylenediamines) having 4 replaceable amino-hydrogens can be prepared in an analogous manner from the appropriately substituted arenes via the o-dinitro and/or o-nitroamino derivatives.

The o-arylenediamines having 3 replaceable amino-hydrogens and the single non-reactive group as hereinbefore defined can be prepared by methods analogous to those described by Tishler et al., J. Am. Chem. Soc. 67, 2165, 1945, for the preparation of N-benzyl-4,5-dimethyl-1,2-phenylenediamine, by Hughes et al., J. Proc. Roy. Soc. N.S. Wales, 71, 421, 1938, for the preparation of 4,5-dimethoxy-N-phenyl-1,2-phenylenediamine, and in U.S. Patent 2,400,872, for the preparation of N-methyl- and N-ethyl-1,2-phenylenediamine.

Typical of the o-arylenediamines which can be employed in the process of the invention are the following known compounds: 1,2-phenylenediamine, 4-methyl-, 4-ethyl-, 4-tert.-butyl-, 4-tert.-amyl-, 3,4-dimethyl-, 3,5-dimethyl-, 4,5-dimethyl-, 3,6-dimethyl-, 3,4,6-trimethyl-, 3,4,5,6-tetramethyl- 4-ethyl-, 3,5,6-trimethyl-, 3,4,5,6-tetraethyl-, 4-chloro- 3,5-dichloro-, 3,6-dichloro-, 4-bromo-, 3,5-dibromo-, 4,5-dibromo-, 3,4,5-tribromo-, 3,5-difluoro-, 3,6-difluoro-, 3,4,6-trifluoro-, 3-bromo-5-methyl-, 3-chloro-4,6-dimethyl-, 6-bromo-3,4-methylenedioxy-, 3,4-dichloro-5,6-dimethyl-, 4,5-dimethoxy-, 3-ethoxy-, 4-ethoxy-3-ethyl - 5,6 - dimethoxy-, 5 - isopropyl-3,4-dimethoxy-, 3,4-methylenedioxy-, 4-phenoxy-, 3-phenyl-, 4-phenyl-, 4-benzhydryl-, N-benzyl-4,5-dimethyl-, 4,5-dimethoxy-N-phenyl-, N-methyl-, N-ethyl-, N-propyl, 4-methoxy-N'-phenyl-, 4-methoxy-N'-propyl-, N-p-bromophenyl-, $N^2$ - p - bromophenyl-4-chloro-, N - (o - chlorophenyl)-4-nitro-, 4-chloro-$N^2$-p-tolyl-, and N-2-naphthyl-1,2-phenylenediamine, 1,2-naphthylenediamine, 2,3-naphthylenediamine, 4-bromo-1,2-naphthylenediamine, 2,3-diaminofluorene, 9,10-diaminophenanthrene, and 4,5-diamino-acenaphthene.

The 2,2'-methylenebisareneimidazoles which can be prepared according to the process of the invention, many of which are known, are useful for a variety of purposes. Illustratively, those 2,2'-methylenebisbenzimidazoles which are unsubstituted or substituted in the benzene nuclei by groups such as alkyl, alkoxy, and the like can be used as dyestuff intermediates in accordance with U.S. Patent 2,697,712. Further, 2,2'-methylenebisbenzimidazoles which are symmetrically or unsymmetrically substituted in the benzene nuclei by alkyl groups can be used as diuretics in mammals. Illustratively, the compounds having the formula:

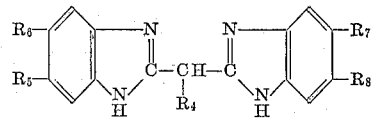

wherein $R_4$ is selected from the class consisting of hydrogen and alkyl, $R_5$, $R_6$, and $R_7$ represent alkyl, $R_8$ is selected from the class consisting of hydrogen and alkyl, and wherein the substitution in one benzene ring differs from that in the other benzene ring, can be used as diuretics and sedatives in mammals. These compounds can be prepared by the process of the invention by employing a protonated carbalkoxyacetimino alkyl ether, preferably a hydrochloride

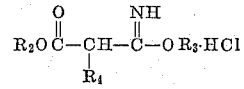

wherein $R_2$, $R_3$, and $R_4$ have the significance hereinbefore defined, and a 1,2-phenylenediamine having the formula:

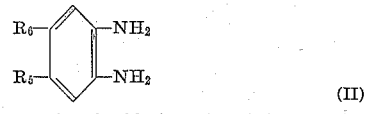

(II)

wherein $R_5$ and $R_6$ have the significance hereinbefore defined, in step (a) of the process and employing a 1,2-phenylenediamine having the formula:

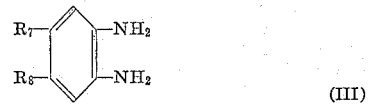

(III)

wherein $R_7$ and $R_8$ have the significance hereinbefore defined, in step (b) of the process. Alternatively, the 1,2-phenylenediamine having the Formula III can be employed in step (a) of the process and the 1,2-phenylenediamine having the Formula II can be employed in step (b) of the process.

The following examples are illustrative of the process and products of the present invention but are not to be construed as limiting.

EXAMPLE 1

5,5',6'-trimethyl-2,2'-methylenebisbenzimidazole and the dihydrochloride thereof

A. 2-CARBETHOXYACETIMINO ETHYL ETHER HYDROCHLORIDE

A solution of 113 g. (1 mole) of ethyl cyanoacetate in a mixture of 46 g. (1 mole) of anhydrous ethanol and 3 liters of anhydrous ether was stirred and cooled to 0° C. Anhydrous hydrogen chloride was passed into the cooled solution until the latter was saturated. The mixture was then stirred at 0° C. for a further 3 hours. The solid which had separated was isolated by filtration, washed thoroughly with ether on the filter, and dried in vacuo. There was thus obtained 179 g. of 2-carbethoxyacetimino ethyl ether hydrochloride in the form of a white solid having a melting point of 111 to 113° C. with decomposition.

B. ETHYL 2-(5,6-DIMETHYL-2-BENZIMIDAZOLYL) ACETATE

A mixture of 6.8 g. (0.05 mole) of 4,5-dimethyl-1,2-phenylenediamine (Beilstein's Handbuch der Organischen Chemie, 13, 179 4th edition, 1930), and 9.8 g. (0.05 mole) of 2-carbethoxyacetimino ethyl ether hydrochloride (prepared as described above) in 100 ml. of absolute ethanol was heated under reflux for 1 hour. To the cooled mixture was added 100 ml. of water and the resulting slurry was made alkaline by the addition of aqueous ammonium hydroxide solution. The solid which had separated was isolated by filtration, washed thoroughly with water, and recrystallized from ethanol. There was thus obtained 8 g. of ethyl 2-(5,6-dimethyl-2-benzimidazolyl)acetate in the form of a crystalline solid having a melting point of 177 to 181° C.

C. 5,5',6'-TRIMETHYL-2,2'-METHYLENEBIS-BENZIMIDAZOLE

A mixture of 4.64 g. (0.02 mole) of ethyl 2-(5,6-dimethyl-2-benzimidazolyl)acetate (prepared as described above), 2.44 g. of 4-methyl-1,2-phenylenediamine (Beilstein's Handbuch der Organischen Chemie, 13, 148, 4th edition, 1930), and 50 ml. of 1,2,4-trichlorobenzene was stirred and heated to 180° C. The temperature of the reaction mixture was then raised over the next 15 minutes to 210° C. and maintained at this level for a further 15 minutes. The reaction mixture was then cooled and diluted with benzene. The solid which had separated was isolated by filtration, washed with benzene, and dried in vacuo. There was thus obtained 5,5',6'-trimethyl-2,2'-methylenebisbenzimidazole.

D. THE DIHYDROCHLORIDE OF 5,5',6'-TRIMETHYL-2,2'-METHYLENEBISBENZIMIDAZOLE

A suspension of 5.82 g. (0.02 mole) of 5,5',6'-trimethyl-2,1,2'-methylenebisbenzimidazole in 50 ml. of absolute ethanol was stirred vigorously and heated to approximately 60° C. To the warm solution was added slowly a solution of 1.5 g. (0.041 mole) of anhydrous hydrogen chloride in 50 ml. of absolute ethanol. The mixture was stirred for a further 15 minutes after the addition was complete. The cooled mixture was treated with 50 ml. of acetone and the suspension so obtained was cooled in ice and stirred for 2 hr. The solid which had separated was isolated by filtration, washed with two 25-ml. portions of acetone, and dried in vacuo. There was thus obtained the dihydrochloride of 5,5',6'-trimethyl-2,2'-methylenebisbenzimidazole in the form of a crystalline solid having a melting point of 320° to 335° C.

*Analysis.*—Calcd. for $C_{18}H_{20}Cl_2N_4$: C, 59.51; H, 5.55; Cl, 19.52; N, 15.42. Found: C, 59.07; H, 5.62; Cl, 18.83; N., 15.35.

EXAMPLE 2

*5,5',6'-trimethyl-2,2'-methylenebisbenzimidazole*

Using the procedure described in Example 1, Part B, but substituting 4-methyl-1,2-phenylenediamine for 4,5-dimethyl-1,2-phenylenediamine, there is obtained ethyl 2-(5-methyl-2-benzimidazolyl)acetate. The latter compound is then reacted with 4,5-dimethyl-1,2-phenylenediamine using the procedure described in Example 1, Part C, to obtain 5,5',6'-trimethyl-2,2-methylenebisbenzimidazole.

EXAMPLE 3

*5,6-dimethyl-5'-ethyl-2,2'-methylenebisbenzimidazole and the dihydrochloride thereof*

Using the procedure described in Example 1, Part C, but substituting 4-ethyl-1,2-phenylenediamine (Karrer et al., Helv. Chim. Acta 17, 1516, 1934), for 4-methyl-1,2-phenylenediamine, there is obtained 5,6-dimethyl-5'-ethyl-2,2'-methylenebisbenzimidazole. The latter compound is converted to its dihydrochloride using the procedure described in Example 1, Part D.

EXAMPLE 4

*5,6-diethyl-5'-methyl-2,2'-methylenebisbenzimidazole and the dihydrochloride thereof*

Using the procedure described in Example 1, Part B, but substituting 4,5-diethyl-1,2-phenylenediamine (Lambooy, supra) for 4,5-dimethyl-1,2-phenylenediamine, there is obtained ethyl 2-(5,6-diethyl-2-benzimidazolyl) acetate. The latter compound is then condensed with 4-methyl-1,2-phenylenediamine, using the procedure described in Example 1, Part C, to obtain 5,6-diethyl-5'-methyl-2,2'-methylenebisbenzimidazole. The compound so obtained is converted to its dihydrochloride using the procedure described in Example 1, Part D.

EXAMPLE 5

*5,5',6'-trimethyl-2,2'-propylidenebisbenzimidazole and the dihydrochloride thereof*

Using the procedure described in Example 1, Part A, but substituting ethyl α-cyanobutyrate (Alexander and Cope, supra) for ethyl cyanoacetate, there is obtained 2-carbethoxybutyrimino ethyl ether hydrochloride. Using the procedure described in Example 1, Part B, but substituting 2-carbethoxybutyrimino ethyl ether hydrochloride for 2-carbethoxyacetimino ethyl ether hydrochloride, there is obtained ethyl 2-(5,6-dimethyl-2-benzimidazolyl)butyrate. The latter compound is then condensed with 4-methyl-1,2-phenylenediamine, using the procedure described in Example 1, Part C, to obtain 5,5',6'-trimethyl-2,2'-propylidenebisbenzimidazole. The compound so obtained is converted to its dihydrochloride using the procedure described in Example 1, Part D.

EXAMPLE 6

*5,5',6'-triethyl-2,2'-methylenebisbenzimidazole and the dihydrochloride thereof*

Using the procedure described in Example 1, Part B, but substituting 4,5-diethyl-1,2-phenylenediamine for 4,5-dimethyl-1,2-phenylenediamine, there is obtained ethyl 2-(5,6-diethyl-2-benzimidazolyl)acetate. The latter compound is then condensed with 4-ethyl-1,2-phenylenediamine, using the procedure described in Example 1, Part C, to obtain 5,5',6'-triethyl-2,2'-methylenebisbenzimidazole. The compound so obtained is converted to its dihydrochloride by the procedure described in Example 1, Part D.

EXAMPLE 7

*5,6-dimethyl-5',6'-diethyl-2,2'-methylenebisbenzimidazole and the dihydrochloride thereof*

Using the procedure described in Example 1, Part C, but substituting 4,5-diethyl-1,2-phenylenediamine for 4-methyl-1,2-phenylenediamine, there is obtained 5,6-dimethyl-5',6'-diethyl-2,2'-methylenebisbenzimidazole. The compound so obtained is converted to its dihydrochloride using the procedure described in Example 1, Part D.

EXAMPLE 8

*5,6-dimethyl-5',6'-diethyl-2,2'-propylidenebisbenzimidazole*

Using the procedure described in Example 1, Part C, 4,5-diethyl-1,2-phenylenediamine is condensed with ethyl 2-(5,6-dimethyl-2-benzimidazolyl)butyrate (prepared as described in Example 5) to obtain 5,6-dimethyl-5',6'-diethyl-2,2'-propylidenebisbenzimidazole.

EXAMPLE 9

*5,5',6'-trimethyl-2,2'-(2,4-dimethylpentylidene)bisbenzimidazole and the dihydrochloride thereof*

Using the procedure described in Example 5, but substituting ethyl α-cyano-β,δ-dimethylcaproate (Alexander and Cope, supra) for ethyl α-cyanobutyrate, there are obtain 5,5',6'-trimethyl-2,2'-(2,4-dimethylpentylidene)bisbenzimidazole and the dihydrochloride thereof.

EXAMPLE 10

*5,6-dimethyl-2,2'-methylenebisbenzimidazole and the dihydrochloride thereof*

A mixture of 4.64 g. (0.02 mole) of ethyl 2-(5,6-dimethylbenzimidazolyl)acetate (prepared as described in Example 1, Part B), and 2.16 g. (0.02 mole) of 1,2-phenylenediamine was heated under nitrogen, with stirring, until reaction started as evidenced by vigorous evolution of ethanol and water. After the reaction had subsided the mixture was heated at 200° C. to 210° C.

for an additional 1 hr. before being cooled. The resulting solid product was crystallized from aqueous ethanol. The crystalline material so obtained was washed with aqueous ethanol and then with methylene chloride before being dried. There was thus obtained 3.9 g. of 5,6-dimethyl-2,2'-methylenebisbenzimidazole in the form of a monohydrate having a melting point of 240° C. to 250° C. with decomposition.

Analysis.—Calcd. for $C_{17}H_{16}N_4 \cdot H_2O$: C, 69.36; H, 6.16; N, 19.04; $H_2O$, 6.12. Found: C, 69.65; H, 6.32; N, 19.60; $H_2O$, 6.18.

Using the procedure described in Example 1, Part D, the 5,6-dimethyl-2,2'-methylenebisbenzimidazole so obtained was converted to its dihydrochloride which had a melting point of 320° C. to 340° C. with decomposition.

EXAMPLE 11

*5,6-dichloro-5',6'-dimethyl-2,2'-methylenebisbenzimidazole and the dihydrochloride thereof*

Using the procedure described in Example 1, Part C, but substituting 4,5 - dichloro - 1,2 - phenylenediamine (Adams and Winnick, J. Am. Chem. Soc. 73, 5687, 1951), for 4-methyl-1,2-phenylenediamine, there was obtained 5,6 - dichloro - 5',6' - dimethyl - 2,2' - methylenebisbenzimidazole in the form of a crystalline solid. The 5,6-dichloro - 5',6' - dimethyl - 2,2' - methylenebisbenzimidazole so obtained was converted to its dihydrochloride using the procedure described in Example 1, Part D. The dihydrochloride so obtained had a melting point of 340° C. to 350° C.

Analysis.—Calcd. for $C_{17}H_{16}Cl_4N_4$: C, 48.83; H, 3.86; N, 13.40; Cl, 33.92. Found: C, 48.23; H, 3.90; N, 13.55; Cl, 33.08.

EXAMPLE 12

*5,6-dibromo-5'6'-dimethyl-2,2'-methylenebisbenzimidazole*

Using the procedure described in Example 11, but substituting 4,5 - dibromo - 1,2 - phenylenediamine (Beilstein's Handbuch der Organischen Chemie, 13, 28, 4th edition, 1930), for 4,5 - dichloro - 1,2 - phenylenediamine, there is obtained 5,6-dibromo-5',6'-dimethyl-2,2'-methylenebisbenzimidazole.

EXAMPLE 13

*5,6-dimethyl-5'-tert.-amyl-2,2'-methylenebisbenzimidazole*

Using the procedure described in Example 1, Part C, but substituting 4 - tert. - amyl - 1,2 - phenylenediamine (Beilstein's Handbuch der Organischen Chemie, 13, 193, 4th edition, 1930), for 4 - methyl - 1,2 - phenylenediamine, there is obtained 5,6 - dimethyl - 5' - tert. - amyl - 2,2' - methylenebisbenzimidazole.

EXAMPLE 14

*5,6-dimethyl-5'-phenyl-2,2'-methylenebisbenzimidazole*

Using the procedure described in Example 1, Part C, but substituting 4 - phenyl - 1,2 - phenylenediamine (Beilstein's Handbuch der Organischen Chemie, 13, 213, 4th edition, 1930), for 4 - methyl - 1,2 - phenylenediamine, there is obtained 5,6 - dimethyl - 5' - phenyl - 2,2' - methylenebisbenzimidazole.

EXAMPLE 15

*5-benzhydryl-5',6'-dimethyl-2,2'-methylenebisbenzimidazole*

Using the procedure described in Example 1, Part C, but substituting 4 - benzhydryl - 1,2 - phenylenediamine (Beilstein's Handbuch der Organischen Chemie, 13, 273, 4th edition, 1930), for 4 - methyl - 1,2 - phenylenediamine, there is obtained 5 - benzhydryl - 5',6' - dimethyl - 2,2' - methylenebisbenzimidazole.

EXAMPLE 16

*6,7-dimethoxy-5-ethoxy-4-ethyl-5',6'-dimethyl-2,2'-methylenebisbenzimidazole*

Using the procedure described in Example 1, Part C, but substituting 5,6 - dimethoxy - 4 - ethoxy - 3 - ethyl - 1,2 - phenylenediamine (Monatsh. 63, 141, 1933), for 4 - methyl - 1,2 - phenylenediamine, there is obtained 6,7 - dimethoxy - 5 - ethoxy - 4 - ethyl - 5',6' - dimethyl - 2,2' - methylenebisbenzimidazole.

EXAMPLE 17

*5,6-dimethyl-5'-phenoxy-2,2'-methylenebisbenzimidazole*

Using the procedure described in Example 1, Part C, but substituting 4 - phenoxy - 1,2 - phenylenediamine (Monatsh. 57, 31, 1931), for 4 - methyl - 1,2 - phenylenediamine, there is obtained 5,6 - dimethyl - 5' - phenoxy-2,2' - methylenebisbenzimidazole.

EXAMPLE 18

*(5,6-dimethyl-2-benzimidazolyl)-(1H-naphth[2,3-d]-2-imidazolyl)methane*

Using the procedure described in Example 1, Part C, but substituting 2,3 - naphthylenediamine (Beilstein's Handbuch der Organischen Chemie, 13, 207, 4th edition, 1930), for 4 - methyl - 1,2 - phenylenediamine, there is obtained (5,6 - dimethyl - 2 - benzimidazolyl) - (1H - naphth[2,3-d]-2-imidazolyl)methane.

EXAMPLE 19

*(5,6-dimethyl-2-benzimidazolyl)-(4-bromo-1H-naphth[2,3-d]-2-imidazolyl)methane*

Using the procedure described in Example 1, Part C, but substituting 4 - bromo - 2,3 - naphthylenediamine (Beilstein's Handbuch der Organischen Chemie, 13, 53, 4th edition, 1st Supplement, 1933), for 4 - methyl - 1, 2 - phenylenediamine, there is obtained (5,6-dimethyl - 2 - benzimidazolyl) - (4 - bromo - 1H - naphth[2,3 - d] - 2 - imidazolyl) methane.

EXAMPLE 20

*2,2'-methylenebis[5,6-dimethylbenzimidazole] and the dihydrochloride thereof*

Using the procedure described in Example 1, Part C, but substituting 4,5 - dimethyl - 1,2 - phenylenediamine for 4 - methyl - 1,2 - phenylenediamine, there is obtained 2,2' - methylenebis[5,6 - dimethylbenzimidazole] having a melting point higher than 330° C. The compound so obtained is converted to its dihydrochloride (melting point higher than 330° C.) using the procedure described in Example 1, Part D.

EXAMPLE 21

*1'-benzyl-5,5',6'-trimethyl-2,2'-methylenebisbenzimidazole*

Using the procedure described in Example 1, Part B, but substituting N - benzyl - 4,5 - dimethyl -1,2 - phenylenediamine (Tishler et al., supra) for 4,5 - dimethyl - 1,2 - phenylenediamine, there is obtained ethyl 2 - (1 - benzyl - 5,6 - dimethyl - 2 - benzimidazolyl)acetate. The latter compound is then condensed with 4 - methyl - 1,2 - phenylenediamine, using the procedure described in Example 1, Part C, to obtain 1'-benzyl-5,5',6'-trimethyl-2,2'-methylenebisbenzimidazole.

EXAMPLE 22

*5,6-dimethoxy-5'-methyl-1-phenyl-2,2'-methylenebisbenzimidazole*

Using the procedure described in Example 1, Part B, but substituting 4,5 - dimethoxy - N - phenyl - 1,2 - phenylenediamine (Hughes et al., supra) for 4,5 - dimethyl - 1,2 - phenylenediamine, there is obtained ethyl 2 - (5,6 - dimethoxy - 1 - phenyl - 2 - benzimidazolyl)

acetate. The latter compound is then condensed with 4 - methyl - 1,2 - phenylenediamine, using the procedure described in Example 1, Part C, to obtain 5,6-dimethoxy-5' - methyl - 1 - phenyl - 2,2' - methylenebisbenzimidazole.

I claim:

1. Process for the preparation of a 2,2'-methylenebisareneimidazole which comprises the steps of reacting a strong mineral acid salt of carbalkoxyacetimino alkyl ether which in the free base form has the formula:

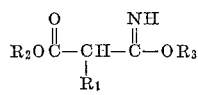

wherein $R_1$ is selected from the class consisting of hydrogen and an indifferent group, and $R_2$ and $R_3$ represent alkyl of from 1 to 8 carbon atoms, inclusive, with an o-arylenediamine of from 6 to 27 carbon atoms, inclusive, having at least 3 replaceable amino-hydrogens and no other groups reactive with the said strong mineral acid salt of carbalkoxyacetimino alkyl ether, to obtain the corresponding alkyl 2-(2-areneimidazolyl)alkanoate, and heating the alkyl 2-(2-areneimidazolyl)alkanoate so obtained with an o-arylenediamine of from 6 to 27 carbon atoms, inclusive, having at least 3 replaceable amino-hydrogens and no other groups reactive with said alkyl 2-(2-areneimidazolyl)alkanoate, to obtain the desired 2,2'-methylenebisareneimidazole.

2. Process for the preparation of an unsymmetrically substituted 2,2'-methylenebisareneimidazole which comprises the steps of reacting a strong mineral acid salt of carbalkoxyacetimino alkyl ether which in the free base form has the formula:

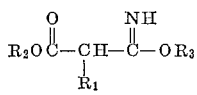

wherein $R_1$ is selected from the class consisting of hydrogen and an indifferent group, and $R_2$ and $R_3$ represent alkyl of from 1 to 8 carbon atoms, inclusive, with an o-arylenediamine of from 6 to 27 carbon atoms, inclusive, having at least 3 replaceable amino hydrogens and no other groups reactive with the said strong mineral acid salt of carbalkoxyacetimino alkyl ether, the aromatic nucleus of said o-arylenediamine being substituted by groups selected from the class consisting of hydrogen, alkyl of from 1 to 8 carbon atoms, inclusive, alkenyl of from 3 to 8 carbon atoms, inclusive, aralkyl of from 7 to 13 carbon atoms, inclusive, aryl of from 6 to 12 carbon atoms, inclusive, halogen, cyano, nitro, alkoxy of from 1 to 8 carbon atoms, inclusive, aralkoxy of from 7 to 13 carbon atoms, inclusive, aryloxy of from 6 to 12 carbon atoms, inclusive, alkylenedioxy of from 1 to 6 carbon atoms, inclusive, alkylmercapto of from 1 to 8 carbon atoms, inclusive, alkyl-substituted amino wherein alkyl is of from 1 to 8 carbon atoms, inclusive, amino substituted by aralkyl of from 7 to 13 carbon atoms, inclusive, and amino substituted by aryl, alkylsulfonyl, and arylsulfonyl of from 6 to 7 carbon atoms, inclusive, and sulfonamido, in the presence of an inert solvent at a temperature within the range of about 20° C. to about 150° C., to obtain the corresponding alkyl 2-(2-areneimidazolyl)alkanoate and heating the alkyl 2-(2-areneimidazolyl)alkanoate so obtained with a differently substituted o-arylenediamine of from 6 to 27 carbon atoms, inclusive, having at least 3 replaceable amino hydrogens and no other groups reactive with said alkyl 2-(2-areneimidazolyl)alkanoate, the aromatic nucleus of said o-arylenediamine being substituted by groups selected from the class consisting of hydrogen, alkyl of from 1 to 8 carbon atoms, inclusive, alkenyl of from 3 to 8 carbon atoms, inclusive, aralkyl of from 7 to 13 carbon atoms, inclusive, aryl of from 6 to 12 carbon atoms, inclusive, halogen, cyano, nitro, alkoxy of from 1 to 8 carbon atoms, inclusive, aralkoxy of from 7 to 13 carbon atoms, inclusive, aryloxy of from 6 to 12 carbon atoms, inclusive, alkenedioxy of from 1 to 6 carbon atoms, inclusive, alkylmercapto of from 1 to 8 carbon atoms, inclusive, aralkylmercapto of from 7 to 13 carbon atoms, inclusive, arylmercapto of from 6 to 12 carbon atoms, inclusive, alkylsubstituted amino wherein alkyl is of from 1 to 8 carbon atoms, inclusive, amino-substituted by aralkyl of from 7 to 13 carbon atoms, inclusive, and amino substituted by aryl, alkylsulfonyl, and arylsulfonyl of from 6 to 7 carbon atoms, inclusive, and sulfonamido at a temperature within the range of about 150° C. to about 250° C. to obtain the desired unsymmetrically substituted 2,2'-methylenebisareneimidazole.

3. Process for the preparation of a 2,2'-methylenebisbenzimidazole which comprises reacting a strong mineral acid salt of carbalkoxyacetimino alkyl ether which in the free base form has the formula:

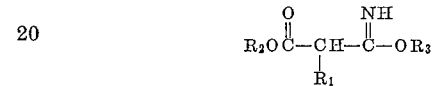

wherein $R_1$ is selected from the class consisting of hydrogen and an indifferent group, and $R_2$ and $R_3$ represent alkyl of from 1 to 8 carbon atoms, inclusive, with a 1,2-phenylenediamine of from 6 to 19 carbon atoms, inclusive, having at least 3 replaceable amino-hydrogens and no other groups reactive with the said strong mineral acid salt of carbalkoxyacetimino alkyl ether to obtain the corresponding alkyl 2-(2-benzimidazolyl)alkanoate, and heating the alkyl 2-(2-benzimidazolyl)alkanoate so obtained with a 1,2-phenylenediamine of from 6 to 19 carbon atoms, inclusive, having at least 3 replaceable amino-hydrogens and no other groups reactive with the said alkyl 2-(2-benzimidazolyl)alkanoate to obtain the desired 2,2'-methylenebisbenzimidazole.

4. Process for the preparation of an unsymmetrically substituted 2,2'-methylenebisbenzimidazole which comprises the steps of reacting a strong mineral acid salt of carbalkoxyacetimino alkyl ether, which in the free base form has the formula:

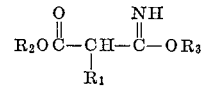

wherein $R_1$ is selected from the class consisting of hydrogen and an indifferent group, and $R_2$ and $R_3$ represent alkyl of from 1 to 8 carbon atoms, inclusive, with a 1,2-phenylenediamine of from 6 to 19 carbon atoms, inclusive, having at least 3 replaceable amino-hydrogens and no other groups reactive with said strong mineral acid salt of carbalkoxyacetimino alkyl ether, the benzene nucleus of said 1,2-phenylenediamine being substituted by from 1 to 4 groups selected from the class consisting of hydrogen, alkyl of from 1 to 8 carbon atoms, inclusive, alkenyl of from 3 to 8 carbon atoms, inclusive, aralkyl of from 7 to 13 carbon atoms, inclusive, aryl of from 6 to 12 carbon atoms, inclusive, halogen, cyano, nitro, alkoxy of from 1 to 8 carbon atoms, inclusive, aralkoxy of from 7 to 13 carbon atoms, inclusive, aryloxy of from 6 to 12 carbon atoms, inclusive, alkylenedioxy of from 1 to 6 carbon atoms, inclusive, alkylmercapto of from 1 to 8 carbon atoms, inclusive, aralkylmercapto of from 7 to 13 carbon atoms, inclusive, arylmercapto of from 6 to 12 carbon atoms, inclusive, alkyl-substituted amino wherein alkyl is of from 1 to 8 carbon atoms, inclusive, amino substituted by aralkyl of from 7 to 13 carbon atoms, inclusive, and amino substituted by aryl, alkylsulfonyl, and arylsulfonyl of from 6 to 7 carbon atoms, inclusive, and sulfonamido in the presence of an inert solvent at a temperature within the range of about 20° C. to about 150° C., to obtain the corresponding alkyl 2-(2-benzimidazolyl)alkanoate, and heating the alkyl 2-(2-benzimidazolyl)alkanoate so obtained at a temperature within the range of about 150° C. to about 250° C. with a differently substituted 1,2-phenylenediamine of from 6 to 19 carbon atoms, inclusive, having at least 3 replaceable amino-hydrogens and no other groups reactive with the said alkyl 2-(2-bisbenzimidazolyl)alkanoate, the benzene nucleus of said 1,2-phenylenediamine being substituted by from 1 to 4 groups selected from the class consisting of hydrogen, alkyl of from 1 to 8 carbon atoms, inclusive, alkenyl of from 3 to 8 carbon atoms, inclusive, aralkyl of from 7 to 13 carbon atoms, inclusive, aryl of from 6 to 12 carbon atoms, inclusive, halogen, cyano, nitro, alkoxy of from 1 to 8 carbon atoms, inclusive, aralkoxy of from 7 to 13 carbon atoms, inclusive, aryloxy of from 6 to 12 carbon atoms, inclusive, alkylenedioxy of from 1 to 6 carbon atoms, inclusive, alkylmercapto of from 1 to 8 carbon atoms, inclusive, aralkylmercapto of from 7 to 13 carbon atoms, inclusive, arylmercapto of from 6 to 12 carbon atoms, inclusive, alkyl-substituted amino wherein alkyl is of from 1 to 8 carbon atoms, inclusive, amino-substituted by aralkyl of from 7 to 13 carbon atoms, inclusive, and amino substituted by aryl, alkylsulfonyl, and arylsulfonyl of from 6 to 7 carbon atoms, inclusive, and sulfonamido to obtain the desired unsymmetrically substituted 2,2'-methylenebisbenzimidazole.

5. A process for the preparation of an unsymmetrically substituted 2,2'-methylenebisbenzimidazole having the formula:

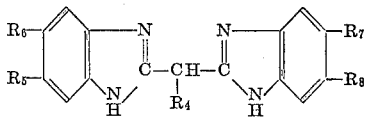

wherein $R_4$, $R_5$, $R_6$, $R_7$, and $R_8$ represent alkyl of from 1 to 8 carbon atoms, inclusive, and wherein the substitution in one benzene ring differs from that in the other benzene ring, which comprises reacting a 1,2-phenylenediamine selected from the class consitsing of:

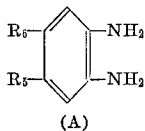

and

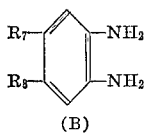

wherein $R_5$, $R_6$, $R_7$, and $R_8$ have the significance hereinbefore defined, with a strong mineral acid salt of carbalkoxyacetimino alkyl ether having the formula:

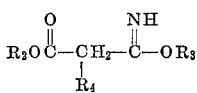

wherein $R_2$ and $R_3$ represent alkyl of form 1 to 8 carbon atoms, inclusive, and $R_4$ has the significance defined above in the presence of an inert solvent at a temperature within the range of about 20° C. and about 150° C., and heating the correspondingly substituted alkyl 2-(2-benzimidazolyl)alkanoate so obtained at a temperature within the range of about 150° C. to about 250° C. with whichever of the 1,2-phenylenediamines of the Formulae A and B was not employed in the first step of the process.

6. A process for the preparation of an unsymmetrically substituted 2,2'-methylenebisbenzimidazole having the formula:

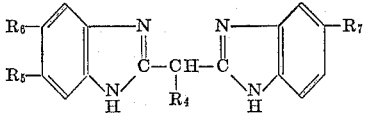

wherein $R_4$, $R_5$, $R_6$, and $R_7$ represent alkyl of from 1 to 8 carbon atoms, inclusive, and wherein the substitution in one benzene ring differs from that in the other benzene ring, which comprises reacting a 1,2-phenylenediamine selected from the class consisting of:

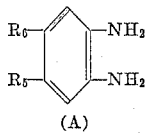

and

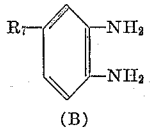

wherein $R_5$, $R_6$, and $R_7$ have the significance hereinbefore defined, with a strong mineral acid salt of carbalkoxyacetimino alkyl ether having the formula:

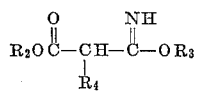

wherein $R_2$ and $R_3$ represent alkyl of from 1 to 8 carbon atoms, inclusive, and $R_4$ has the significance defined above, in the presence of an inert solvent at a temperature within the range of about 20° C. and about 150° C., and heating the correspondingly substituted alkyl 2-(2-benzimidazolyl)alkanoate so obtained at a temperature within the range of about 150° C. to about 250° C. with whichever of the 1,2-phenylenediamines of the Formulae A and B was not employed in the first step of the process.

7. The process which comprises reacting 4,5-dialkyl-1,2-phenylenediamine, wherein alkyl is of from 1 to 8 carbon atoms, inclusive, with strong mineral acid salt of carbethoxyacetimino ethyl ether to obtain the corresponding ethyl 2-(5,6-dialkyl-2-benzimidazolyl)acetate, and heating the ethyl 2-(5,6-dialkyl-2-benzimidazolyl)acetate so obtained with 4-alkyl-1,2-phenylenediamine wherein alkyl is of from 1 to 8 carbon atoms, inclusive, to obtain 5,5',6'-trialkyl-2,2'-methylenebisbenzimidazole.

8. The process which comprises reacting 4,5-dialkyl-1,2-phenylenediamine, wherein alkyl is of from 1 to 8 carbon atoms, inclusive, with strong mineral acid salt of carbethoxyacetimino ethyl ether to obtain the corresponding ethyl 2-(5,6-dialkyl-2-benzimidazolyl)acetate and heating the ethyl 2-(5,6-dialkyl-2-benzimidazolyl)acetate so obtained with 4,5-dihalo-1,2-phenylenediamine to obtain 5,6-dihalo-5',6'-dialkyl - 2,2' - methylenebisbenzimidazole.

References Cited by the Examiner

UNITED STATES PATENTS 2,985,661   5/61   Hein et al. _____ 260—304
3,029,236   4/62   Staeuble et al. _____ 260—249.5

OTHER REFERENCES

Hofmann: Imidazole and Its Derivatives, Part I, pages 260–2, 266–7, N.Y., Interscience, 1953.

Lane: Jour. Chem. Soc. (London), 1953, pages 2238–40.

Lane: Jour. Chem. Soc. (London), 1955, pages 1079–81.

Schipper et al.: In Elderfield Heterocyclic Compounds, vol. 5, pages 278–80, 287, N.Y., Wiley, 1957.

Wright: Chemical Reviews, vol. 48, pages 397, 408–11, 431, and 444 (1951).

WALTER A. MODANCE, *Primary Examiner*.

JOHN D. RANDOLPH, *Examiner*.